United States Patent [19]

Kirsch et al.

[11] Patent Number: 4,557,921

[45] Date of Patent: Dec. 10, 1985

[54] PURIFICATION OF HALIDE

[75] Inventors: Warren B. Kirsch, Baton Rouge; Sebastian M. Laurent, Greenwell Springs, both of La.

[73] Assignee: Ethyl Corporation, Richmond, Va.

[21] Appl. No.: 625,355

[22] Filed: Jun. 27, 1984

[51] Int. Cl.[4] .................. C01B 7/07; B01D 53/00
[52] U.S. Cl. ...................... 423/488; 55/71; 55/73; 55/75
[58] Field of Search ............... 55/71, 73, 75; 423/341, 423/342, 488

[56] References Cited

U.S. PATENT DOCUMENTS

| | | | |
|---|---|---|---|
| 3,197,942 | 8/1965 | Haisty et al. | 55/71 |
| 3,682,594 | 8/1972 | Fish | 423/341 |
| 3,702,886 | 11/1972 | Argauer | 423/328 |
| 3,709,979 | 1/1973 | Chu | 423/328 |
| 3,832,449 | 8/1974 | Rosinski | 423/328 |
| 3,953,587 | 4/1976 | Lee et al. | 55/73 |
| 4,016,245 | 4/1977 | Plank | 423/328 |
| 4,046,859 | 9/1977 | Plank | 423/328 |
| 4,076,842 | 2/1978 | Plank | 423/328 |

FOREIGN PATENT DOCUMENTS 50016  3/1984  Japan.

OTHER PUBLICATIONS

The Encyclopedia of Chemistry, 3rd Ed., Ed. by Clifford A. Hampel & Gessner G. Hawley, Van Nostrand Reinhold Co., 1973, pp. 685–687.
"American Mineralogist," vol. 28, p. 545, 1943, Dec. 1943.
Zeolon ® Molecular Sieves, Norton, 1982.
*Adsorption by Dehydrated Zeolite Crystals in Zeolite Molecular Sieves*, D. W. Breck, Riley Interscience Publishers, 1974, pp. 607–611, 616, 618–619, and 625–627.

Primary Examiner—John Doll
Assistant Examiner—Jeffrey E. Russel
Attorney, Agent, or Firm—Donald L. Johnson; John F. Sieberth; John F. Hunt

[57] ABSTRACT

A process for the removal of hydrogen halides including HCl and HF, and/or sulfur dioxide from silicon tetrafluoride. Contaminated gaseous silicon tetrafluoride is passed through a column of zeolite preferably in the hydrogen cation form so as to permit recovery of silicon tetrafluoride containing less than about 10% of the original contamination levels. Acid-stable zeolite materials suitable for the process of the invention are subjected to a flow of hot gases to permit regeneration of the column for use in a semicontinuous process.

23 Claims, No Drawings

PURIFICATION OF HALIDE

FIELD OF THE INVENTION

The present invention relates in general to the purification of a halide stream and in particular to the use of zeolites for the removal of hydrogen halides and sulfur dioxide from the acidic gas, silicon tetrafluoride.

BACKGROUND OF THE INVENTION

Silicon tetrafluoride is a by-product recoverable from the phosphate fertilizer industry and has numerous applications which make it a commercial commodity. In the normal recovery of silicon tetrafluoride from fluosilicic acid, the silicon tetrafluoride becomes contaminated with significant amounts of hydrogen halides such as hydrogen chloride or hydrogen fluoride which form during the beneficiation from phosphate ores.

Silicon tetrafluoride is a difficult chemical to handle in that it is acidic and has a very low boiling point, thus limiting the use of materials for contact with it. There exists a need to provide materials which may contact the silicon tetrafluoride without significant degradation caused by the acid character of the silicon tetrafluoride. There also exists a need to remove the hydrogen halide contamination present in the silicon tetrafluoride. The presence of hydrogen halides is detrimental in certain processes where silicon tetrafluoride is a reactant.

Similarly, it has been found that silicon tetrafluoride sometimes contains significant amounts of sulfur dioxide ($SO_2$) contaminant which has odor problems and can cause problems in subsequent processing of the silicon tetrafluoride. Thus there exists a need for a material which may be contacted with silicon tetrafluoride and will remove sulfur dioxide.

Certain naturally occurring hydrated metal aluminum silicates are called zeolites. Some of these are called mordenites. The synthetic adsorbents of the invention have compositions similar to some of the natural mordenites. The most common of the zeolites are sodium zeolites. Zeolites are useful as adsorbents, detergent builders, cracking catalysts and molecular sieves. Mordenites of the invention are particularly useful as adsorbents.

Zeolites consist basically of a three-dimensional framework of $SiO_4$ and $AlO_4$ tetrahedra. The tetrahedra are crossatoms linked by the sharing of oxygen atoms so that the ratio of oxygen atoms to the total of the aluminum and silicon atoms is equal to two or oxygen/(Al+Si)=2. The electrovalence of each tetrahedra containing aluminum is balanced by the inclusion in the crystal of a cation, for example, a sodium ion. This balance may be expressed by the formula Al/Na=1. The spaces between the tetrahedra are occupied by water molecules prior to dehydration.

Mordenite may be distinguished from other zeolites and silicates on the basis of X-ray powder diffraction patterns and certain physical characteristics. The X-ray patterns for mordenite are described hereinafter. Composition and density are among the characteristics which have been found to be important in identifying zeolites.

The basic formula for all crystalline sodium zeolites may be represented as follows:

$$Na_2O \cdot Al_2O_3 \cdot xSiO_2 \cdot yH_2O$$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative numbers of these atoms do not significantly alter the crystal structure of physical properties of the zeolite. For mordenite an average value for "x" is about 10.0 with the "x" value usually falling within the range 10.0±1.00 However, mordenites may be modified to values "x" far in excess of these limits.

The value of "y" is not necessarily an invariant for all samples of zeolites. This is true because various exchangeable ions are of different size, and since there is no major change in the crystal lattice dimensions upon ion exchange, the space available in the pores of the zeolite to accommodate water molecules varies.

The formula for mordenite may be written as follows:

$$0.9 \pm 0.2 Na_2O \cdot Al_2O_3 \cdot 10.0 \pm 1.5\ SiO_2 \cdot yH_2O$$

and wherein "y" may be any value up to 9.

The pores of zeolites normally contain water.

The above formula represents the chemical analysis of mordenite. When other materials as well as water are in the pores, chemical analysis will show a lower value of "y" and the presence of other adsorbates. The presence in the crystal lattice of materials volatile at temperatures below about 600° C. does not significantly alter the usefulness of the zeolites as an adsorbent since the pores are usually freed of such volatile materials during activation.

Among the ways of identifying zeolites and distinguishing them from other zeolites and other crystalline substances, the X-ray powder diffraction pattern has been found to be a useful tool. In obtaining X-ray powder diffraction patterns, standard techniques are employed. The radiation is the $K\alpha$ doublet of copper, and a Geiger counter or proportional counter spectrometer with a strip chart pen recorder is normally used. The peak heights, I, and the positions as a functions of $2\theta$ where $\theta$ is the Bragg angle, are read from a spectrometer chart. From these, the relative intensities, $100I/I_O$, where $I_O$ is the intensity of the strongest line or peak, and "d" the interplanar spacing in Angstroms (Å) corresponding to the recorded lines are calculated.

X-ray powder diffraction data for sodium mordenite are given in Table A. Relative intensity, $100I/I_O$ and the "d" values in Angstroms (Å) for the observed lines are shown. In a separate column are listed the Miller indices (h, k, l) for an orthohombic unit cell.that corresponds to the observed lines in the X-ray diffraction patterns.

TABLE A

| SYNTHETIC LARGE-PORE NA-MORDENITE | | |
|---|---|---|
| (Å) | $100I/I_o$ | h,k,l |
| 13.4 | 40 | 110 |
| 10.2 | 10 | 020 |
| 9.02 | 70 | 200 |
| 6.50 | 50 | 111 |
| 6.32 | 30 | 130 |
| 6.02 | 10 | 021 |
| 5.75 | 20 | 201 |
| 5.03 | 2 | 221 |
| 4.84 | 2 | 131 |
| 4.50 | 35 | 330 |
| 4.12 | 5 | 041 |
| 3.97 | 70 | 420 |
| 3.81 | 15 | 150 |
| 3.73 | 10 | 241 |
| 3.52 | 10 | 002 |

TABLE A-continued

SYNTHETIC LARGE-PORE NA-MORDENITE

| (A) | 100I/I$_o$ | h,k,l |
|---|---|---|
| 3.45 | 100 | 112 |
| 3.37 | 60 | 510 |
| 3.28 | 10 | 022 |
| 3.21 | 55 | 202 |
| 3.13 | 10 | 060 |

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for mordenite are not to exclude those materials which, due to some variable mentioned or otherwise known to those skilled in the art, fail to show all of the lines, or show a few extra ones that are permissible in the orthorhombic system of that zeolite, or show a slight shift in position of the lines, so as to give a slightly larger or smaller lattice parameter.

The sodium form of mordenite may be treated with ammonium cation (NH$_4^+$) to replace some of the sodium cation. Treatment with ammonium is followed by heating to drive off the gaseous ammonia (NH$_3$). Quite typically, ammonium nitrate, NH$_4$NO$_3$ or ammonium chloride, NH$_4$Cl or similar materials are used as the source of ammonium cation to replace the sodium cation in the mordenite. Alternatively, mordenite may be treated with a dilute strong acid to leach out some of the sodium and substituting a proton. Although the hydrogen cation form has an effect on the X-ray diffraction pattern and other characteristics of the mordenite (in comparison to the sodium form), the changes are minor and well-recognized by one skilled in the art. An example of a commercially available mordenite of the hydrogen cation form is Zeolon ® 900H. This product and those like it are known to be thermally stable and acid resistive or acid stable.

A simple test described in "American Mineralogist," Vol. 28, page 545, 1943, permits a quick check of the silicon to aluminum ratio of the zeolite. According to the description of the test, zeolite materials with a three-dimensional network that contains aluminum and silicon atoms in an atomic ratio of Al/Si=$\frac{2}{3}$ =0.67, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

SUMMARY OF THE INVENTION

The present invention relates to a method of purifying silicon tetrafluoride, particularly the removal of hydrogen halides and sulfur dioxide from silicon tetrafluoride. The silicon tetrafluoride is contacted with a zeolite such as by passing a stream of silicon tetrafluoride gas through a column of zeolite, preferably a mordenite material. The zeolites show a good capacity for removal of HCl, HF, etc. and SO$_2$; some of the zeolites show good capacity for the removal of SO$_2$ alone. Therefore, the present invention provides a process for the removal of hydrogen halides or SO$_2$ from silicon tetrafluoride by contacting the silicon tetrafluoride contaminated with a hydrogen halide, especially HCl, and/or SO$_2$ with a zeolite material and then recovering the purified silicon tetrafluoride.

The invention includes all crystalline aluminosilicates which will permit the removal of HCl or SO$_2$ from a predominantly silicon tetrafluoride stream without capturing any significant portion of the silicon tetrafluoride and without effecting substantial decomposition of the aluminosilicate.

Many zeolites are suitable for adsorption in the presence of HCl and other hydrogen halides. Most natural minerals are not as effective as the synthetic ones. HCl and HF tend to break down natural mordenite faster than the synthetic materials and the sodium form of mordenite is less acid stable than the hydrogen cation form.

The removal of sulfur dioxide and hydrogen halides like HCl from SiF$_4$ is desirable since they cause various problems such as corrosivity, odor, and interference with subsequent reactions of the silicon tetrafluoride product.

While the removal of HF and HCl are discussed below, the invention is suitable for removal of HBr and HI. In the discussion below, the silicon tetrafluoride sources contained levels of HCl which broke through the zeolite before a capacity determination for HF, SO$_2$, or the hydrogen halides could be observed. Thus the limits for adsorption of contaminants other than HCl are unknown Also, it is unknown how adsorption limits are affected by mixtures of contaminants versus single contaminants but all such variations are included in the invention.

The extent of removal of contaminants other than hydrogen halides and sulfur dioxide has not been accurately determined but the invention includes removal of other contaminants from silicon tetrafluoride. Thus the invention is also a method for purifying silicon tetrafluoride contaminated with at least one member selected from HX where X is a halide and sulfur dioxide.

The present invention includes a method of purifying silicon tetrafluoride contaminated with HX where X is a halide comprising the steps of contacting said contaminated silicon tetrafluoride with an acid-stable zeolite that selectively removes HX and recovering the purified silicon tetrafluoride.

The present invention also includes a process for the purification of silicon tetrafluoride contaminated with sulfur dioxide, comprising the steps of contacting said silicon tetrafluoride with an acid-stable zeolite that selectively removes sulfur dioxide and recovering the purified silicon tetrafluoride.

The present invention is also a semicontinuous process for the removal of HX where X is a halide from a stream of gaseous silicon tetrafluoride containing a deleterious amount of HX, said process comprising the steps of:

(a) passing said stream through a column packed with an acid-stable zeolite so as to recover the effluent stream with an HX content of less than about 10% of the original contamination until the column is so saturated that it permits breakthrough of HX above about 10% of the original contamination;

(b) regenerating the column so as to permit recovery of silicon tetrafluoride purified to less than about 10% of the stream contamination; and (c) repeating step (a).

The invention comprehends the purification of silicon tetrafluoride containing any objectionable or deleterious level of a hydrogen halide and/or sulfur dioxide. This amount may be as little as a few parts per billion in some cases. In other cases it may be much larger. A typical range is 0.1 to 10 mole percent objectionable material in commercially available silicon tetrafluoride.

The present invention is also a semicontinuous process for the removal of sulfur dioxide from a stream of gaseous silicon tetrafluoride containing a deleterious amount of sulfur dioxide said process comprising the steps of:
 (a) passing said stream through a column packed with an acidstable zeolite so as to recover the effluent stream with a sulfur dioxide content of less than about 10% of the original contamination until the column is so saturated that it permits breakthrough of sulfur dioxide above about 10% of the original contamination;
 (b) regenerating the column so as to permit recovery of silicon tetrafluoride purified to less than about 10% of the stream contamination; and
 (c) repeating step a).

DESCRIPTION OF THE PREFERRED EMBODIMENT

Applicants have found that various sources of silicon tetrafluoride and various methods of producing silicon tetrafluoride produce a product which contains contaminants including hydrogen chloride and sulfur dioxide. Due to the corrosivity of the hydrogen chloride and the reactivity and odor problems of the sulfur dioxide, their removal from the silicon tetrafluoride is highly desirable before subsequent use of the silicon tetrafluoride.

Applicants have discovered that zeolites are suitable for the removal of hydrogen chloride and sulfur dioxide contaminants from silicon tetrafluoride. While a preferred embodiment is described herein, various synthetic and naturally occurring materials are suitable for the invention. Other suitable synthetic zeolites include the zeolites of types X, Y, and F and the family of ZSM zeolites. The ZSM zeolites are described in U.S. Pat. No. 3,702,886; U.S. Pat. No. 3,709,979; U.S. Pat. No. 3,832,449; U.S. Pat. No. 4,076,842; U.S. Pat. No. 4,016,245; and U.S. Pat. No. 4,046,859 all of which are incorporated herein by reference in their entirety. Among the natural materials are chabazite, levynite, gmelinite, phillipsite, mordenite, clinoptilolite, and others.

Some of these other zeolites will separate HCl and optionally sulfur dioxide or separately sulfur dioxide by various mechanisms. These mechanisms are affected by the difference between the bonding of a polar vs. a nonpolar molecule with a solid surface. Some of these materials admit both silicon tetrafluoride and HCl molecules and/or sulfur dioxide molecules into their internal porous structure but only sorb or retain the HCl and/or sulfur dioxide. Other zeolite materials may sorb and retain both sulfur dioxide and silicon tetrafluoride. The invention includes such materials so long as silicon tetrafluoride is purified of the HCl and/or sulfur dioxide even though some silicon tetrafluoride may be lost or difficult to recover by other means.

The invention, in various embodiments, may be operated at atmospheric, subatmospheric, or superatmospheric pressures.

In a preferred embodiment of the invention, mordenite of hydrogen cation form is used to remove hydrogen chloride from silicon tetrafluoride. Also, mordenite of the sodium or hydrogen cation form are useful for the removal of sulfur dioxide. In the hydrogen cation form of the mordenite, substantially all of the cation positions are filled by hydrogen.

Applicants have found that about one part by weight of a zeolite material is sufficient to remove significant hydrogen chloride and/or sulfur dioxide contamination from at least about an equivalent part of silicon tetrafluoride having such a hydrogen chloride or sulfur dioxide contamination, usually at levels of up to about 10% by weight. While a 1:1 weight ratio may not at first appear to be significant, such is the case since one pound of silicon tetrafluoride gas (the atmospheric state of silicon tetrafluoride) represents a huge volume of silicon tetrafluoride which may be purified by a small column of the zeolite materials. We have not been able to determine the exact capacity of the various zeolites for sulfur dioxide but information is given below on the capacity of the hydrogen cation form of mordenite for removal of hydrogen chloride. Any processes within the capability of the zeolites for removal of HCl and/or sulfur dioxide are within the scope of the invention.

Typical streams of silicon tetrafluoride may contain contaminant portions of about 0.1 up to about 10% HCl. Very typically, commercially available silicon tetrafluoride from the phosphate fertilizer industry contains, for example, about 2.5 to 2.8 mole percent HCl.

The mordenite materials are particularly preferable for the process of the present invention since the silicon tetrafluoride gas and the contaminant HCl are acidic and the mordenites have been found to be very much acid resistant or acid-stable materials. For example most of the zeolite A materials would be destroyed by silicon tetrafluoride or hydrogen chloride.

Applicants have found that the zeolite material of the invention has a somewhat higher capacity for removal of hydrogen chloride if the silicon tetrafluoride flow rate is reduced. Also, various regeneration methods are useful for returning the bed to operation after breakthrough of the hydrogen chloride from a long period of operation with the zeolite materials. A preferred method of regeneration is set forth below. Applicants have found that there is a slight decrease in the saturation limit of the zeolite materials after regeneration but this is most likely affected by the degree and type of regeneration used on the zeolite materials.

In our early work for the determination of removal of sulfur dioxide from a stream of silicon tetrafluoride, we investigated the capacity of the hydrogen and sodium cation forms of mordenite for the removal of $SO_2$. A one-half inch diameter by 7 inch packed column containing about 13 grams of Norton's Zeolon ® Z-900H mordenite (hydrogen cation form) was used to absorb $SO_2$ from samples of silicon tetrafluoride gas at ambient temperature and pressure at a rate of about 25 grams per hour. The mordenite material was first activated by drying at 125° C. with a nitrogen purge for several hours. After the preparation of this material and use in the column it was discovered that sulfur dioxide breakthrough occurred after about 1–5 hours depending upon the concentration of sulfur dioxide which varied from about 0.31 to 0.38 mole percent. Also the different streams treated contained from about 0.08 to 4.55 percent hydrogen chloride and as much as about 0.15 mole percent hydrogen fluoride. The column described was usually sufficient to absorb SO$_2$ from about 200-220 grams of silicon tetrafluoride contaminated as described. The bed was regenerated by various techniques including heating for as along as 16 hours at about 130°. Nevertheless total capacity for removal of sulfur dioxide was not accurately determined and varied significantly between runs.

Additional experiments with silicon tetrafluoride containing about 0.01 mole percent sulfur dioxide, 3 mole percent hydrogen chloride and 0.1 mole percent hydrogen fluoride indicated that all three were substantially quantitatively removed.

The process of the invention is illustrated in the non-limiting example below of the best mode of the invention now known to Applicants.

EXAMPLE 1

Two 12 inch diameter × 14 ft. carbon steel columns were packed to about one-half full with Norton Zeolon ® Z-900H mordenite (hydrogen cation form) and connected in series for a flow of silicon tetrafluoride gas contaminated with hydrogen chloride. The silicon tetrafluoride stream containing about 2.5 to 2.8 mole percent hydrogen chloride was passed through the two beds in series until significant breakthrough of the hydrogen chloride contaminant occurred in the first bed. Thereafter, the stream was diverted to the second bed while the first bed was regenerated. The first bed which had become saturated with hydrogen chloride contaminant was regenerated by blowing nitrogen gas heated to about 230° F. through the bed in a flow counter to the direction of the silicon tetrafluoride flow until the bed reached about 200° F. after 21 hours. Thereafter, the regeneration was continued with an ambient temperature nitrogen gas purge until the bed cooled to approximately 120° F. whereupon a vacuum was pulled on the bed to remove any resident nitrogen. Generally, the silicon tetrafluoride flow was passed down through the bed whereas the regeneration step was carried out blowing nitrogen up through the bed. Use of the bed in this manner and regeneration as described was also effective for removing any sulfur dioxide contaminant present in the incoming stream as evidenced by analysis of the effluent streams.

The above-described regeneration scheme is exemplary and various other schemes and gases could be used to regenerate the zeolite material.

When the beds were operated in this manner with the stream of silicon tetrafluoride contaminated with 2.5 to 2.8 mole percent HCl as described, the capacity of the hydrogen cation form of mordenite was found to be about 5.9 pounds silicon tetrafluoride per pound of mordenite or about 0.056 pounds of hydrogen chloride per pound of hydrogen cation form of mordenite. After the regeneration of the first bed, the stream is diverted back to the first bed and the second bed may be regenerated at that point or later regenerated at saturation.

The first bed of mordenite in the process described was very effective for the removal of hydrogen chloride from silicon tetrafluoride. After about 32 hours of operation of the first bed the effluent stream of silicon tetrafluoride was detected to have remaining therein about 1% of the original HCl present in the feed stream to the bed. Similarly, after about 55 hours the effluent stream was detected to have about 8% of the feed stream HCl (about 0.2 mole percent) breaking through, indicating that saturation of the bed had occurred. After the first bed was regenerated as described above, substantially the same pattern of purification and saturation was observed; i.e., after 42 hours about 1% of the feed stream HCl was detected to have passed through the bed in the effluent silicon tetrafluoride stream and after about 66 hours about 80% of the HCl contamination in the feed stream was found to pass through to the effluent stream.

In subsequent experiments with silicon tetrafluoride streams containing a small amount of sulfur dioxide and up to about 2.85 mole percent hydrogen chloride, and small amounts of HF, various experiments revealed that the bed containing a hydrogen cation form of mordenite as described was effective to purify about 5-6 pounds of silicon tetrafluoride per pound of hydrogen cation form of mordenite and thereafter the effluent stream quickly rose to a level of 0.5 to 2.5 mole percent hydrogen chloride contamination.

Additional experiments were carried out with streams of silicon tetrafluoride containing about 2.75, 2.57, 2.45, and 2.01 mole percent HCl. Two columns of the hydrogen cation form of mordenite were operated in series and in some cases the first stage of the two columns was regenerated while the second stage continued operation. In each case and at all times effluent streams contained less than 10% of the original hydrogen chloride contamination prior to passing through the columns or column. Similarly the HF values in the effluent streams were essentially zero.

While a preferred embodiment of the invention has been given above, it is possible to vary certain features of the invention without departing from the scope or spirit thereof as defined by the following claims.

We claim:

1. A method of purifying gaseous silicon tetrafluoride contaminated with at least one member selected from the group consisting of sulfur dioxide and HX where X is a halide, said method comprising the steps of contacting gaseous silicon tetrafluoride with an acidstable mordenite zeolite that selectively removes said at least one member and recovering the purified gaseous silicon tetrafluoride.

2. The method of claim 1 wherein said at least one member is HX.

3. The method of claim 2 wherein X is chloride.

4. The method of claim 2 wherein X is fluoride.

5. The method of claim 2 wherein said silicon tetrafluoride is also contaminated with sulfur dioxide and said step of contacting gaseous silicon tetrafluoride with an acid-stable mordenite zeolite selectively removes both HX and sulfur dioxide.

6. The method of claim 2 wherein said silicon tetrafluoride contains up to about 10 mole percent HX and the silicon tetrafluoride is contacted with said mordenite zeolite so as to remove at least about 90% of the HX.

7. The method of claim 1 wherein said mordenite zoelite is of the hydrogen cation form.

8. The method of claim 7 wherein about one part or less by weight hydrogen cation form of mordenite is used per part of silicon tetrafluoride.

9. The method of claim 7 wherein said silicon tetrafluoride contains at least about 2 weight percent HX.

10. The process of claim 7 wherein said silicon tetrafluoride contaminated with HX also contains sulfur dioxide.

11. The method of claim 7 wherein said method is carried out in a column of said mordenite zeolite.

12. The method of claim 7 carried out at a temperature below about 30° C.

13. The method of claim 1 wherein said at least one member is sulfur dioxide.

14. The process of claim 13 wherein said mordenite zeolite is in the hydrogen cation form.

15. The process of claim 14 wherein up to about one part by weight hydrogen cation form mordenite is used to contact said silicon tetrafluoride per part contaminated silicon tetrafluoride.

16. The process of claim 14 carried out at a temperature below about 30° C.

17. A semicontinuous process for the removal of HX where X is a halide from a stream of gaseous silicon tetrafluoride containing a deleterious amount of HX, said process comprising the steps of:
   (a) passing said stream through a column packed with an acidstable mordenite zeolite stream with an HX content of less than about 10% of the original contamination until the column is so saturated that it permits breakthrough of HX above about 10% of the original contamination;
   (b) regenerating the column and recovering silicon tetrafluoride purified to less than about 10% of the stream contamination; and
   (c) repeating step a).

18. The process of claim 1 wherein said mordenite is of the hydrogen cation form.

19. The semicontinuous process of claim 17 wherein said regenerating comprises contacting said column with a gas which removes HX from the zeolite.

20. The process of claim 19 wherein said gas is nitrogen.

21. The process of claim 19 wherein said gas is heated to about 230° F. and blown through said column until said mordenite zeolite in said column reaches about 200° F.

22. The process of claim 19 wherein the gas is passed through said column in said opposite direction from the silicon tetrafluoride stream.

23. A semicontinuous process for the removal of sulfur dioxide from a stream of gaseous silicon tetrafluoride containing a deleterious amount of sulfur dioxide, said process comprising the steps of:
   (a) passing said stream through a column packed with an acidstable mordenite zeolite and recovering said stream with a sulfur dioxide content of less than about 10% of the original contamination until the column is so saturated that it permits breakthrough of sulfur dioxide above about 10% of the original contamination;
   (b) regenerating the column and recovering silicon tetrafluoride purified to less than about 10% of the stream contamination; and
   (c) repeating step a).

* * * * *

UNITED STATES PATENT AND TRADEMARK OFFICE
CERTIFICATE OF CORRECTION

PATENT NO. : 4,557,921

DATED : DECEMBER 10, 1985

INVENTOR(S) : WARREN B. KIRSCH, ET AL.

It is certified that error appears in the above-identified patent and that said Letters Patent is hereby corrected as shown below:

Column 4, line 32, reads "unknown Also" and should read -- unknown. Also --.

Column 5, line 15, reads "acidstable" and should read -- acid-stable --.

Column 8, line 38, reads "acidstable" and should read -- acid-stable --.

Column 9, line 17, reads "acidstable" and should read -- acid-stable --.

Column 9, line 17, reads "zeolite stream" and should read -- zeolite and recovering said stream --.

Column 9, line 27, reads "Claim 1" and should read -- Claim 17 --.

Column 10, line 18, reads "acidstable" and should read -- acid-stable --.

Signed and Sealed this

Fourth Day of March 1986

[SEAL]

Attest:

DONALD J. QUIGG

Attesting Officer

Commissioner of Patents and Trademarks